(12) United States Patent
Dulzo et al.

(10) Patent No.: US 8,489,312 B2
(45) Date of Patent: Jul. 16, 2013

(54) METHOD AND SYSTEM FOR DETECTING OPERATING ERRORS IN A VARIABLE VALVE TIMING ENGINE

(75) Inventors: Joseph R. Dulzo, Novi, MI (US);
Joshua D. Cowgill, Hartland, MI (US);
Andrew P. Bagnasco, Plymouth, MI (US)

(73) Assignee: GM Global Technology Operations LLC

( * ) Notice: Subject to any disclaimer, the term of this patent is extended or adjusted under 35 U.S.C. 154(b) by 930 days.

(21) Appl. No.: 12/608,280

(22) Filed: Oct. 29, 2009

(65) Prior Publication Data

US 2011/0106405 A1    May 5, 2011

(51) Int. Cl.
G06F 19/00    (2011.01)
G06G 7/70    (2006.01)
F02D 13/04    (2006.01)

(52) U.S. Cl.
USPC ............ 701/114; 701/103; 123/321; 123/352

(58) Field of Classification Search
USPC .................. 123/321, 349, 350, 352; 701/103, 701/110, 111, 114; 73/114.79
See application file for complete search history.

(56) References Cited

U.S. PATENT DOCUMENTS

| | | | | |
|---|---|---|---|---|
| 5,033,290 | A * | 7/1991 | Seki et al. ................... | 73/114.79 |
| 5,626,108 | A * | 5/1997 | Kato et al. .................. | 123/90.15 |
| 7,444,236 | B2 * | 10/2008 | Wiles ............................ | 701/114 |
| 2004/0187566 | A1 * | 9/2004 | Nisimura ..................... | 73/117.3 |
| 2005/0217620 | A1 * | 10/2005 | Shindou ....................... | 123/90.15 |
| 2008/0052042 | A1 * | 2/2008 | Mc Lain et al. ............... | 702/185 |
| 2009/0107225 | A1 * | 4/2009 | Ishizuka et al. ............ | 73/114.15 |
| 2010/0126260 | A1 * | 5/2010 | Bowling et al. ............. | 73/114.37 |
| 2010/0168986 | A1 * | 7/2010 | Iwazaki et al. ................ | 701/103 |
| 2010/0175462 | A1 * | 7/2010 | Doering et al. ............ | 73/114.31 |
| 2010/0175463 | A1 * | 7/2010 | Doering et al. ............ | 73/114.37 |

* cited by examiner

*Primary Examiner* — Willis R Wolfe, Jr.
*Assistant Examiner* — Anthony L Bacon

(57) ABSTRACT

A method and control module includes a manifold absolute pressure comparison module that determines a function of the manifold absolute pressure and an average manifold absolute pressure for a plurality of cylinders and that compares the manifold absolute pressure parameter to a manifold absolute pressure threshold. The control module includes a misfire event module that compares the misfire parameter to a misfire threshold. A hardware remedy module performs a valve actuation hardware remedy in response to comparing the manifold absolute pressure and comparing the misfire parameter.

21 Claims, 13 Drawing Sheets

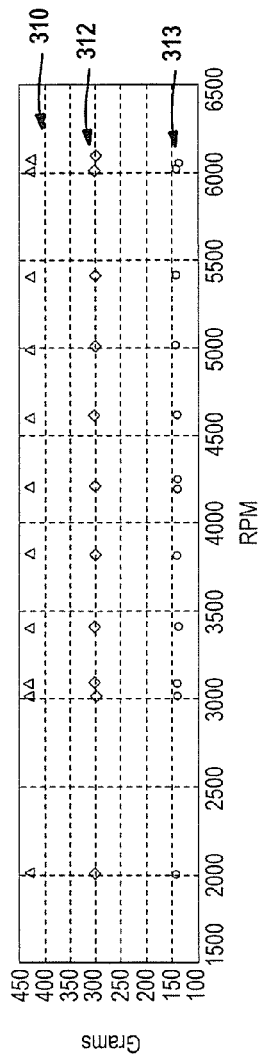

FIG. 6A

○ Light Load APC
◇ Medium Load APC
△ Heavy Load APC

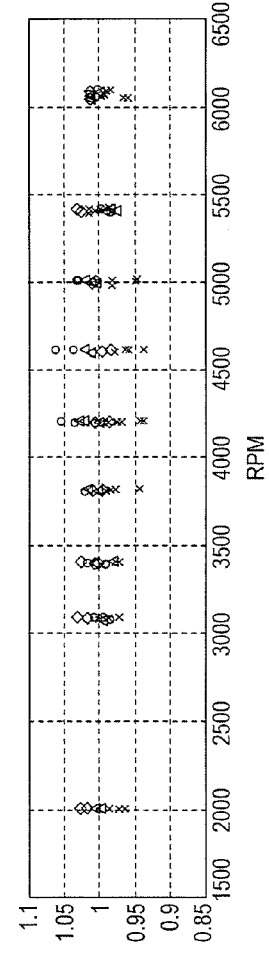

FIG. 6B

○ Injector A Correction, Baseline Data
◇ Injector B Correction, Baseline Data
△ Injector C Correction, Baseline Data
✕ Injector D Correction, Baseline Data

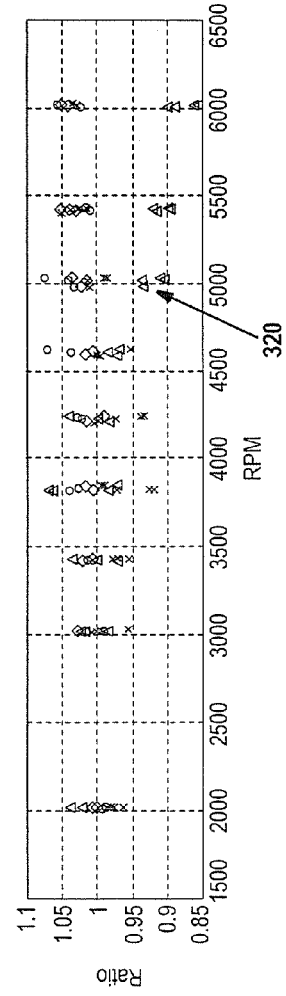

FIG. 6C

○ Injector A Correction, Cyl C SRFF Stuck Low
◇ Injector B Correction, Cyl C SRFF Stuck Low
△ Injector C Correction, Cyl C SRFF Stuck Low
✕ Injector D Correction, Cyl C SRFF Stuck Low

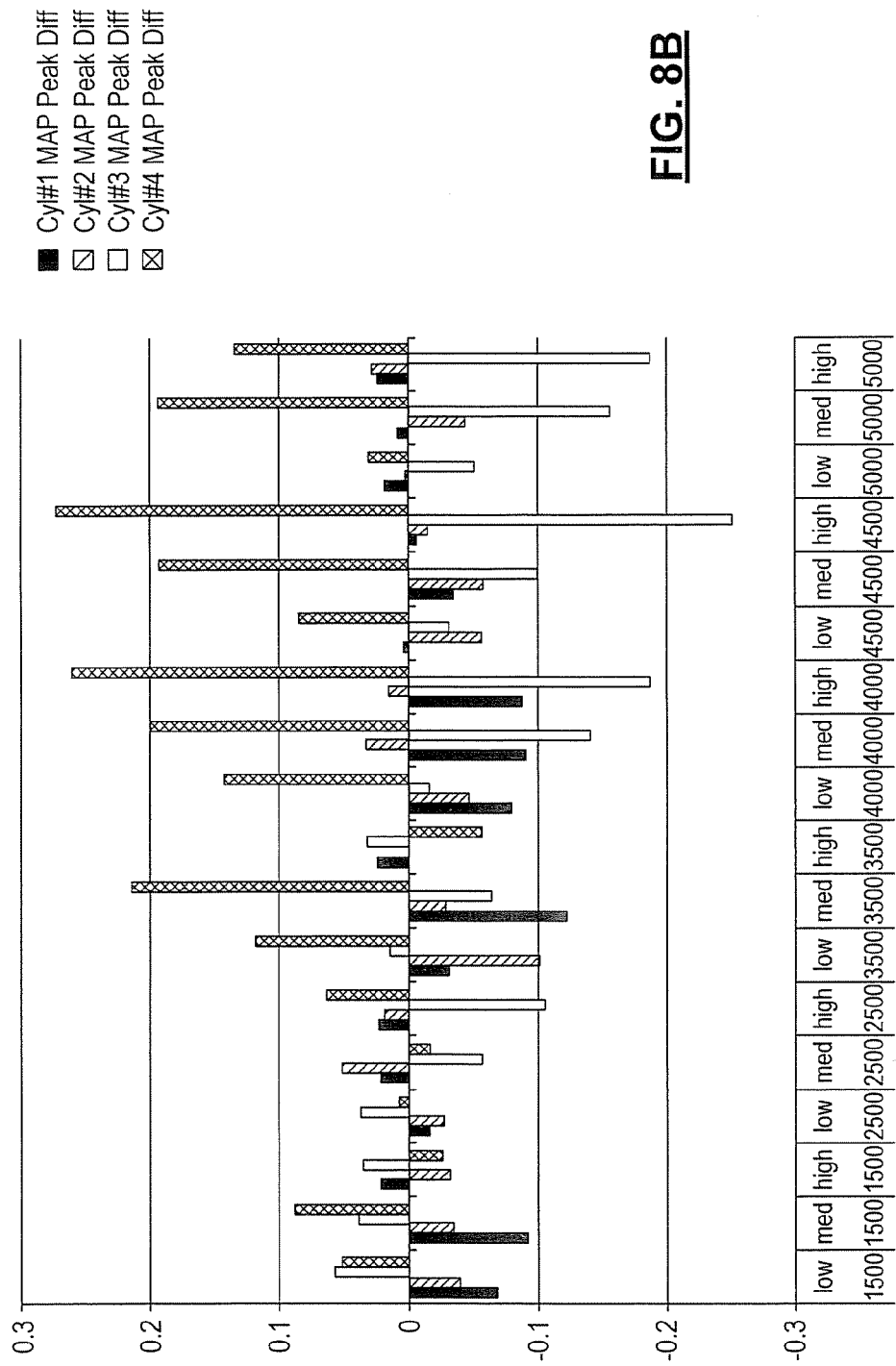

Effect Of One Failed SRFF On Misfire - 3500 RPM Light Load

Effect Of One Failed SRFF On Misfire - 3500 RPM Medium Load

Effect Of One Failed SRFF On Misfire - 3500 RPM Heavy Load

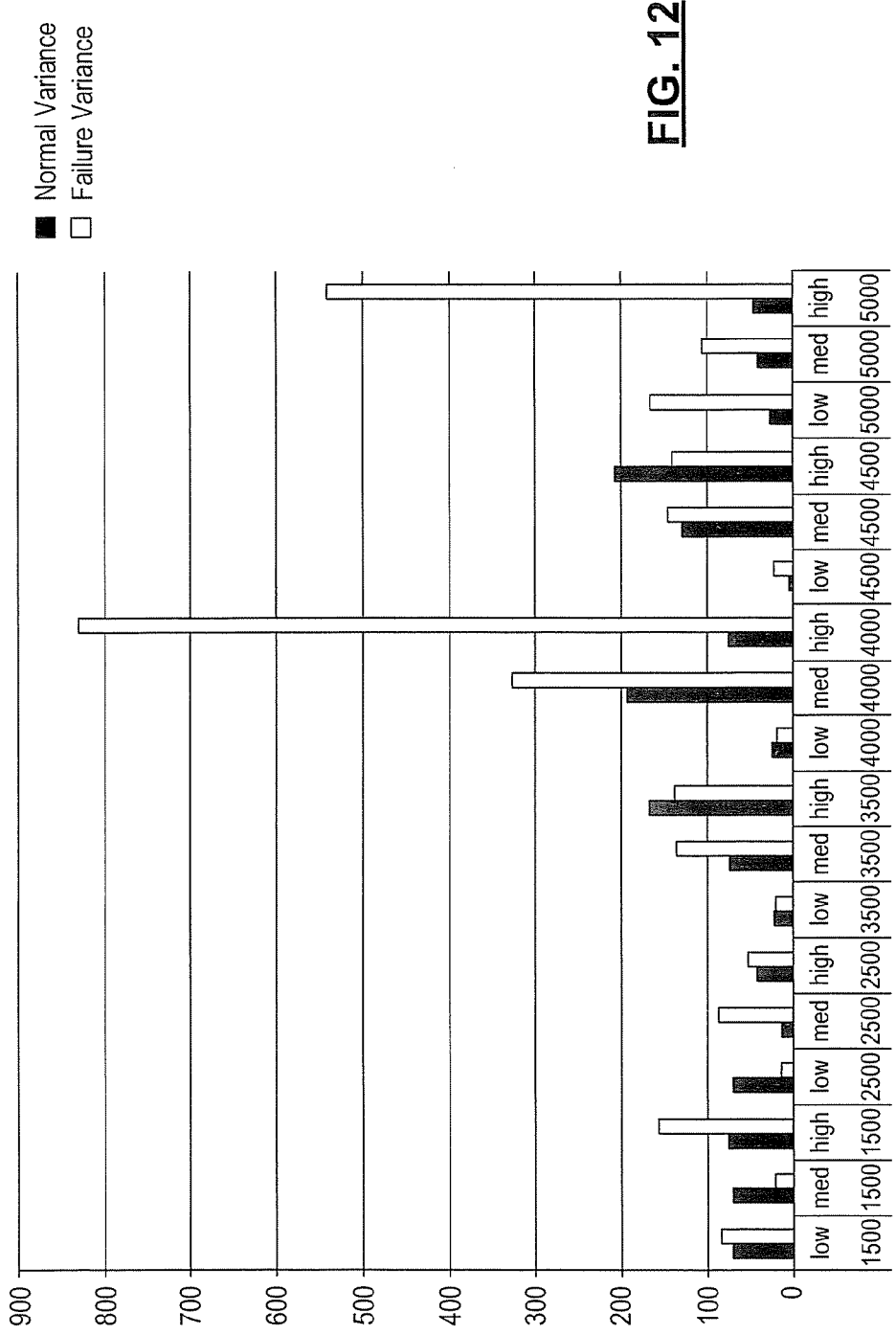

METHOD AND SYSTEM FOR DETECTING OPERATING ERRORS IN A VARIABLE VALVE TIMING ENGINE

FIELD OF THE DISCLOSURE

The present disclosure relates to variable valve actuation systems, and more particularly to systems for reducing errors in operating variable valve actuation systems.

BACKGROUND OF THE DISCLOSURE

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating camshaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift).

Variable valve actuation (VVA) technology improves fuel economy, engine efficiency, and/or performance by modifying a valve lift event, timing, and duration as a function of engine operating conditions. Two-step VVA systems include variable valve assemblies, such as hydraulically-controlled switchable roller finger followers (SRFFs). SRFFs enable two discrete valve states (e.g., a low-lift state or a high-lift state) on the intake and/or exhaust valves.

Referring to FIG. 1, a hydraulic lift mechanism (i.e., an SRFF mechanism) 10 is shown in more detail. Those skilled in the art can appreciate that the SRFF mechanism 10 is merely exemplary in nature. The SRFF mechanism 10 is pivotally mounted on a hydraulic lash adjuster 12 and contacts the valve stem 14 of an inlet valve 16 that selectively opens and closes an inlet passage 18 to a cylinder 20. The engine inlet valve 16 is selectively lifted and lowered in response to rotation of an inlet camshaft 22 on which multiple cam lobes (e.g., low-lift cam lobe 24 and high-lift cam lobe 26) are mounted. The inlet camshaft 22 rotates about an inlet camshaft axis 28. Although the exemplary embodiment describes the SRFF mechanism 10 operating on the engine inlet valve 16, those skilled in the art can appreciate that an SRFF mechanism may operate similarly on an exhaust valve 30.

A control module transitions an SRFF mechanism from a low-lift state to a high-lift state, and vice versa, based on demanded engine speed and load. For example, an internal combustion engine operating at an elevated engine speed, such as 4,000 revolutions per minute (RPMs), typically requires the SRFF mechanism to operate in a high-lift state to avoid potential hardware damage to the internal combustion engine.

Hydraulic cam phaser movement and positioning is achieved by controlling the flow of oil to the cam actuator, such as a phaser. The flow control is done with a valve capable of supplying oil to a volume on one side of a vane in a phaser while simultaneously providing a path for the volume on the other side of the vane to vent or return to a tank. The rate of oil flow is a function of the area of the flow port that is exposed. The control of the flow is achieved by varying the amount of force applied to the valve spool, which may be obtained from a solenoid.

As mentioned above, two-step SRFF have a maximum speed of operation in the low-lift state. The inertia of the mechanism operating the low-lift state above the maximum engine speed will exceed the spring force, which maintains the contact between the SRFF and the cam lobe. The resulting separation between the SRFF and the cam may eventually fatigue the parts and cause damage. Preventing damage increases the durability of the engine.

SUMMARY

The present disclosure provides a diagnostic method to recognize valve actuation hardware failure and take remedial action to prevent engine hardware damage.

In one aspect of the disclosure, a method includes determining a manifold absolute pressure (MAP), determining an MAP parameter based on a function of the MAP and an average MAP for a plurality of cylinders, comparing the MAP parameter to a MAP threshold, determining a misfire parameter, comparing the misfire parameter to a misfire threshold, performing a valve actuation hardware remedy in response to comparing the MAP and comparing the misfire parameter.

In yet another aspect of the disclosure, a control module includes an MAP comparison module that compares a function of the MAP and an average MAP for a plurality of cylinders and that compares the MAP parameter to an MAP threshold. The control module includes a misfire event module that compares the misfire parameter to a misfire threshold. A hardware remedy module performs a valve actuation hardware remedy in response to comparing the MAP and comparing the misfire parameter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6A is a speed versus load matrix for high-lift operations at various engine speeds;

FIG. 6B is baseline data for fuel correction factor versus engine speed for properly operating cylinders;

FIG. 6C is an fuel correction factor versus speed plot illustrating one cylinder is rich due to an airflow restriction;

Figure 7A:
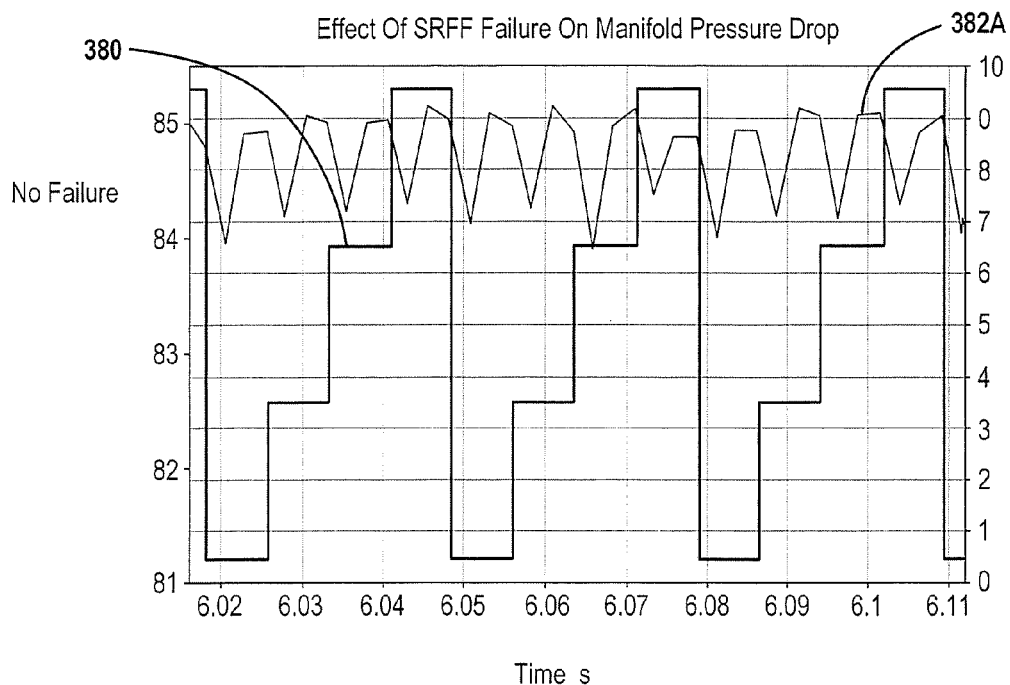
Figure 7B:
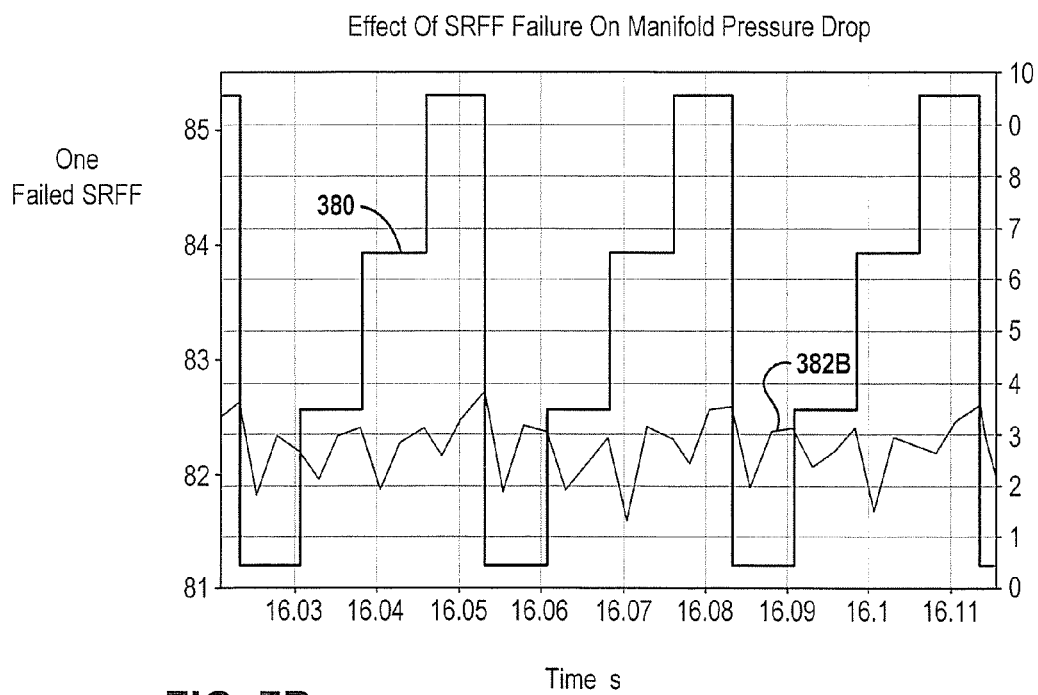
Figure 8A:
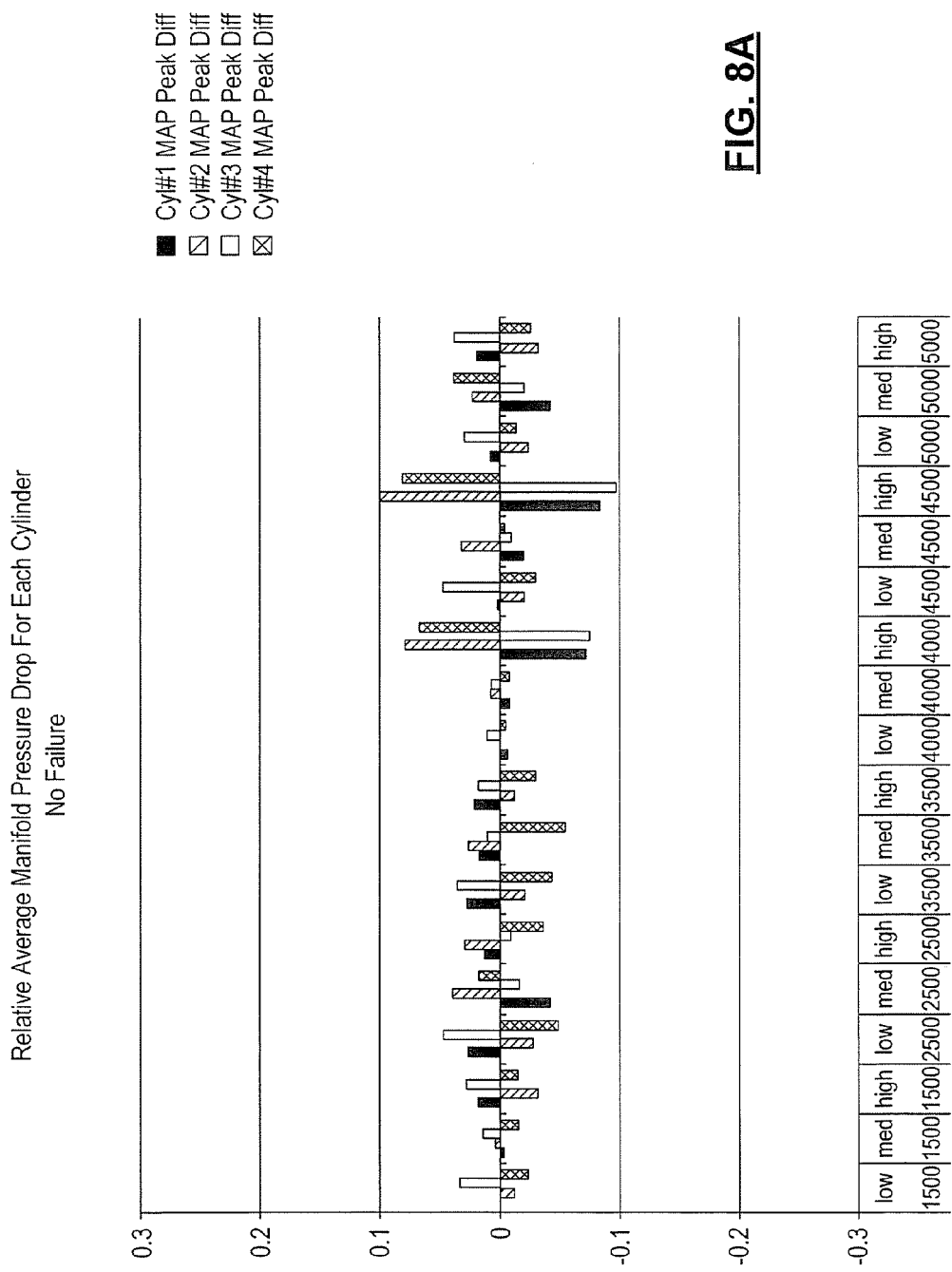
Figure 9A:
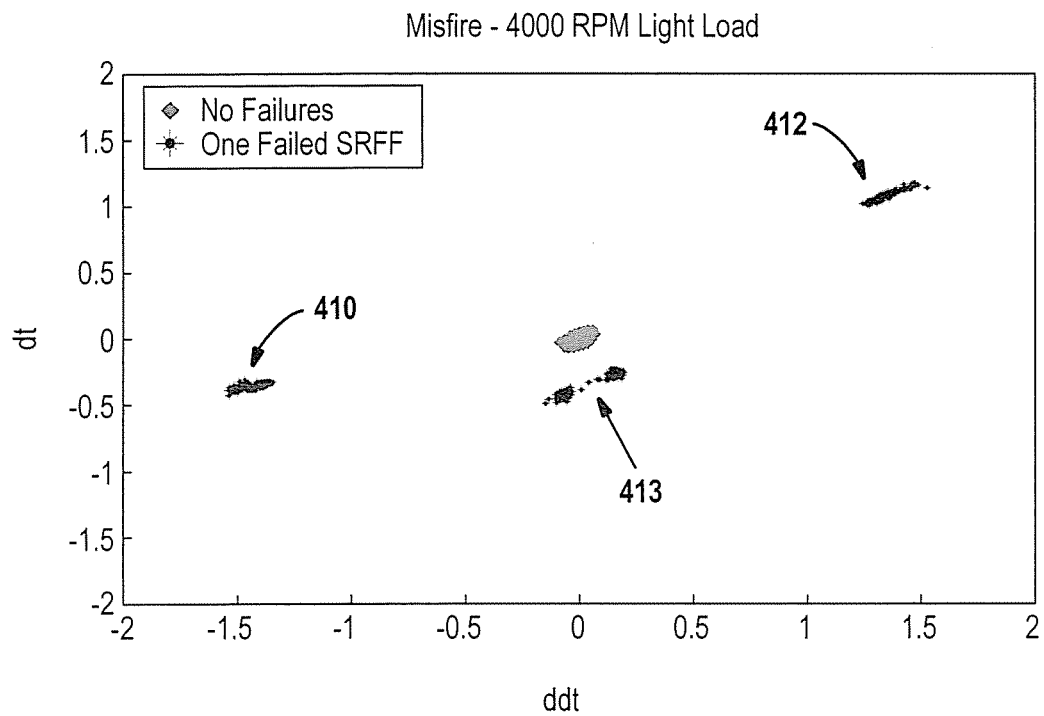
Figure 9B:
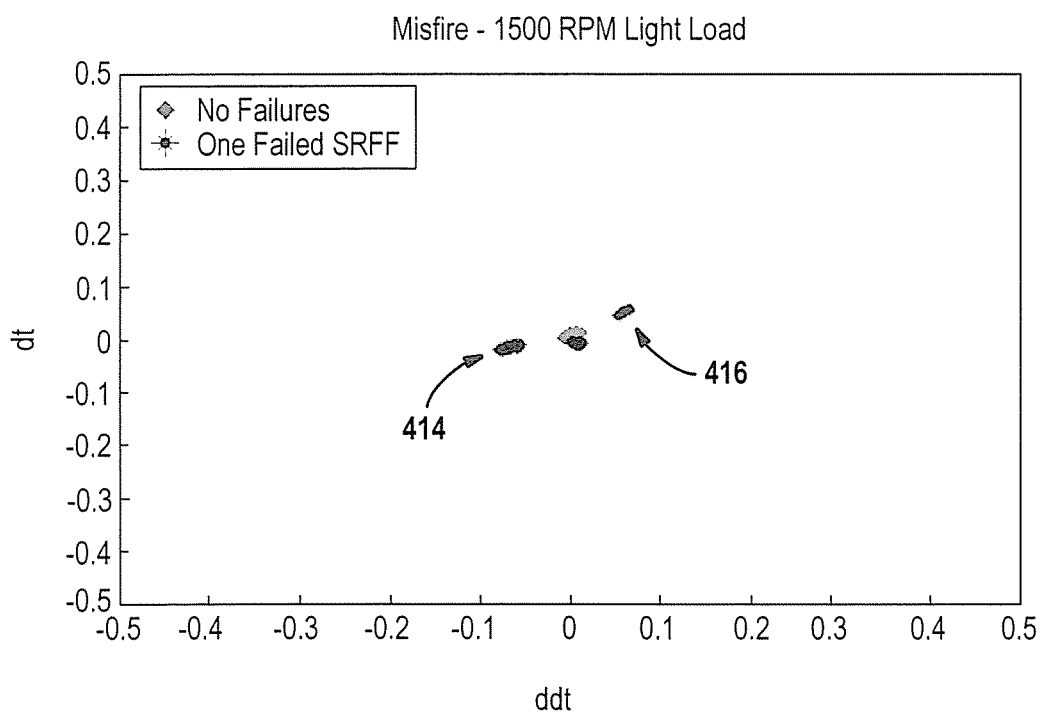
Figure 10A:
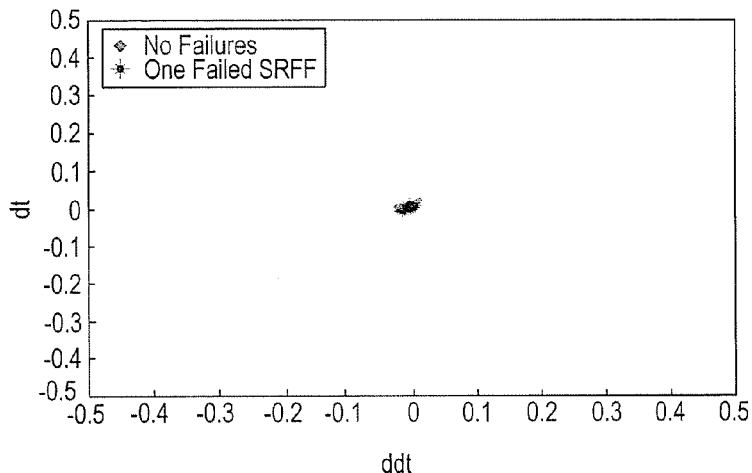
Figure 10B:
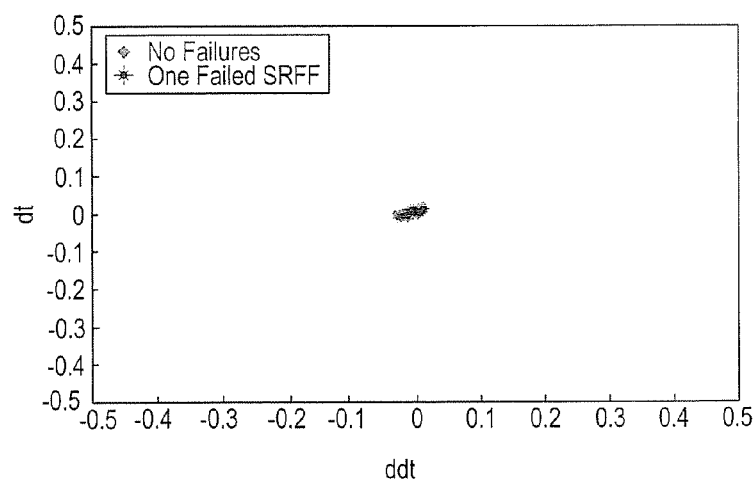
Figure 10C:
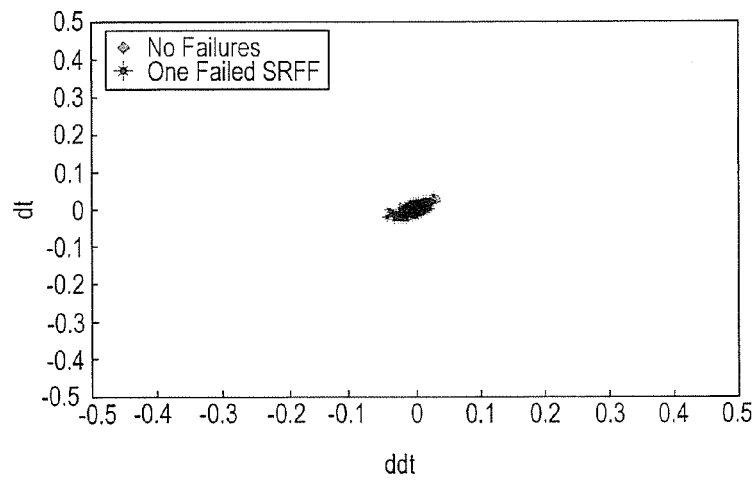
Figure 11A:
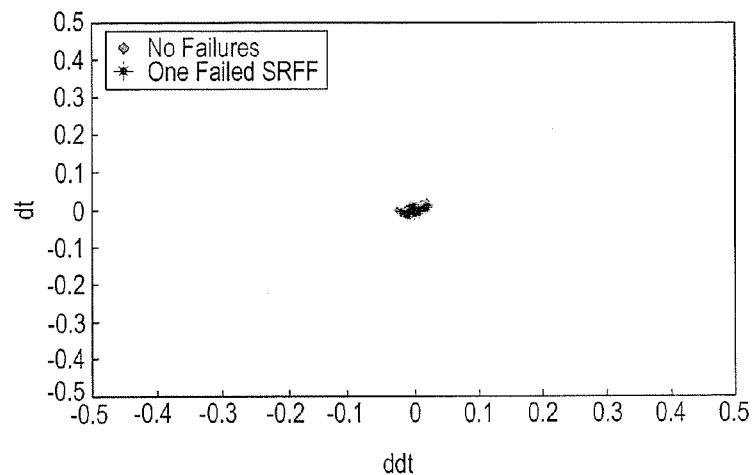
Figure 11B:
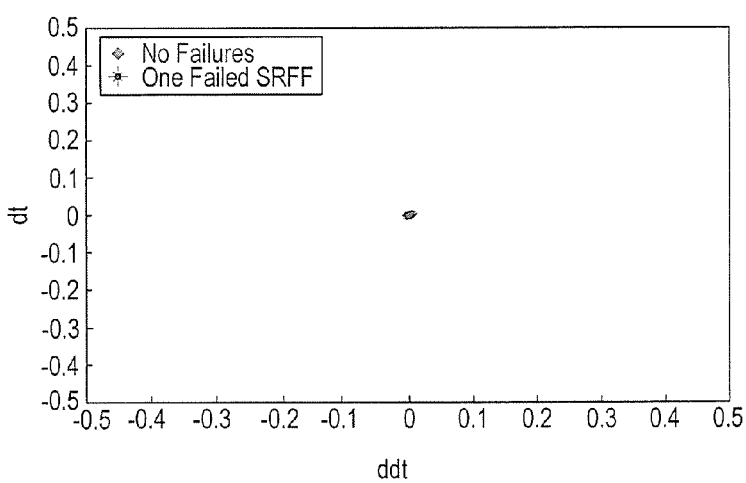
Figure 11C:
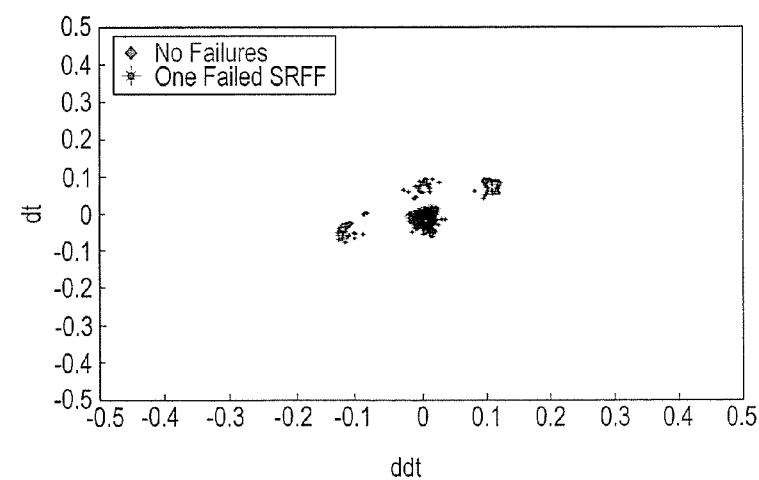

FIGS. 7A and 7B contrast no failure versus failure, respectively for a manifold pressure drop versus time signal;

FIG. 8A is a plot of relative average manifold pressure drop for each cylinder for a no-failure condition;

FIG. 8B is a relative average manifold pressure drop for each cylinder when one SRFF has failed;

FIG. 9A is a plot of a reference time difference (first derivative) (DT) versus a second derivative of time (DDT) at a low-speed light load condition;

FIG. 9B is a plot of DT versus DDT at a high rpm light load condition;

FIGS. 10A-10C illustrate the effect of one SRFF misfire at a medium speed at various loads;

FIGS. 11A-11C illustrate a failed SRFF at a high engine speed condition at various loads; and FIG. 12 is a plot of cylinder to cylinder air/fuel cylinder imbalance with one failed SRFF that increases to illustrate the failed SRFF.

DETAILED DESCRIPTION

The following description of the preferred embodiment is merely exemplary in nature and is in no way intended to limit the disclosure, its application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
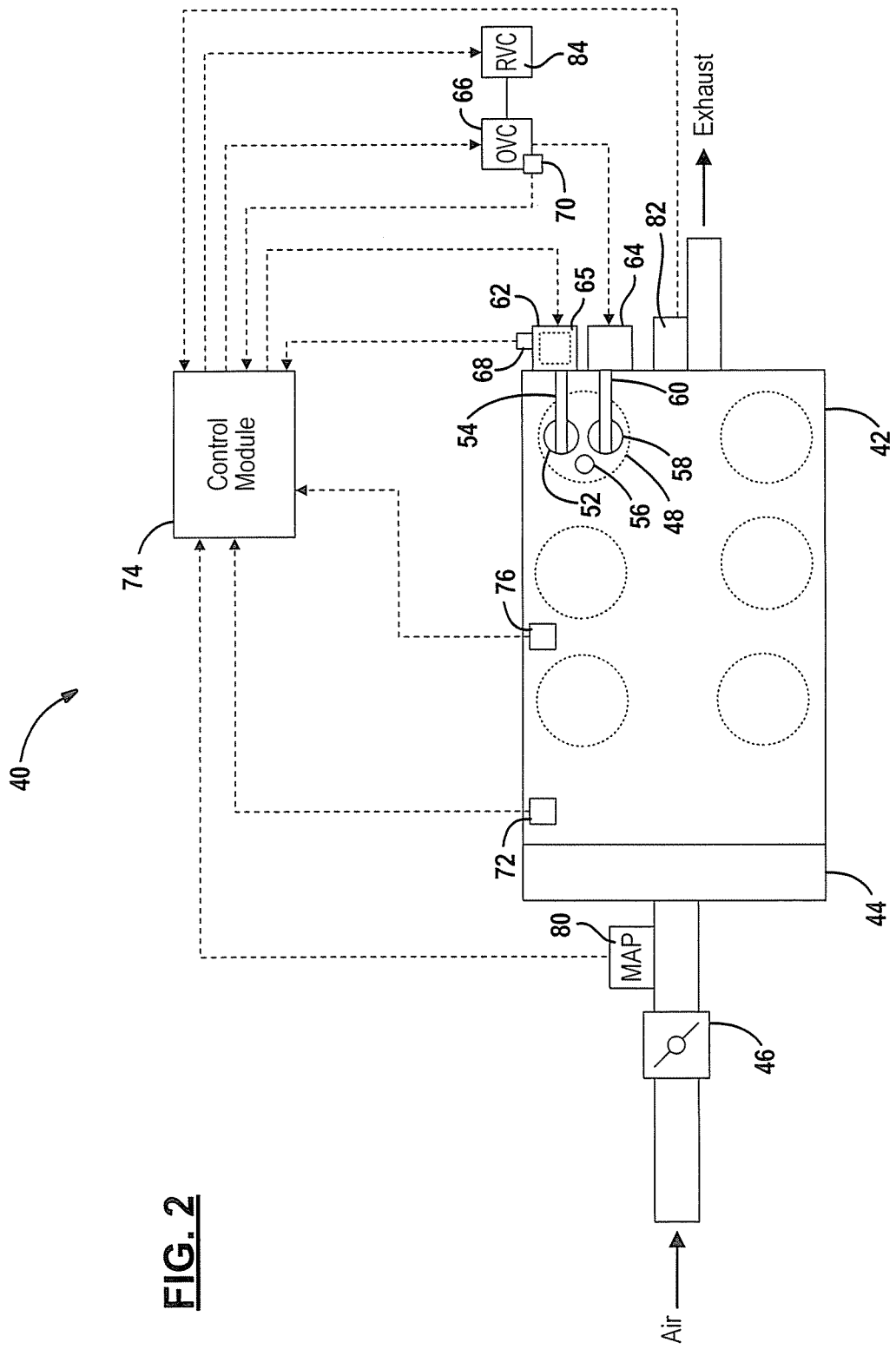
FIG. 2 is a functional block diagram of an exemplary vehicle including a control system according to the present disclosure.

Referring now to FIG. 2, an engine system 40 includes an engine 42 that combusts an air and fuel mixture to produce drive torque. Air is drawn into an intake manifold 44 through a throttle 46. The throttle 46 regulates mass air flow into the intake manifold 44. Air within the intake manifold 44 is distributed into cylinders 48. Although six cylinders 48 are illustrated, it is appreciated that the diagnostic system of the present disclosure can be implemented in engines having a plurality of cylinders including, but not limited to, 2, 3, 4, 5, 8, 10, and 12 cylinders.

A fuel injector (not shown) injects fuel that is combined with the air as it is drawn into the cylinder 48 through an intake port. The fuel injector may be an injector associated with an electronic or mechanical fuel injection system, a jet or port of a carburetor or another system for mixing fuel with intake air. The fuel injector is controlled to provide a desired air-to-fuel (A/F) ratio within each cylinder 48.

An intake valve 52 selectively opens and closes to enable the A/F mixture to enter the cylinder 48. The intake valve position is regulated by an intake camshaft 54. A piston (not shown) compresses the A/F mixture within the cylinder 48. A spark plug 56 initiates combustion of the A/F fuel mixture, driving the piston in the cylinder 48. The piston drives a crankshaft (not shown) to produce drive torque. Combustion exhaust within the cylinder 48 is forced out an exhaust port when an exhaust valve 58 is in an open position. The exhaust valve position is regulated by an exhaust camshaft 60. The exhaust is treated in an exhaust system. Although single intake and exhaust valves 52 and 58 are illustrated, it can be appreciated that the engine 42 can include multiple intake and exhaust valves 52 and 58 per cylinder 48.

The engine system 40 may include an intake cam phaser 62 and an exhaust cam phaser 64 that respectively regulate the rotational timing of the intake and exhaust camshafts 54 and 60. More specifically, the timing or phase angle of the respective intake and exhaust camshafts 54 and 60 can be retarded or advanced with respect to each other or with respect to a location of the piston within the cylinder 48 or with respect to crankshaft position.

In this manner, the position of the intake and exhaust valves 52 and 58 can be regulated with respect to each other or with respect to a location of the piston within the cylinder 48. By regulating the position of the intake valve 52 and the exhaust valve 58, the quantity of A/F mixture ingested into the cylinder 48, and therefore the engine torque, is regulated.

The cam phaser 62 can include a phaser actuator 65 that is either electrically or hydraulically actuated. Hydraulically actuated phaser actuators 65, for example, include an electrically-controlled fluid control valve, such as an oil control valve (OCV) 66 that controls a fluid supply flowing into or out of the phaser actuator 65.

Figure 1:
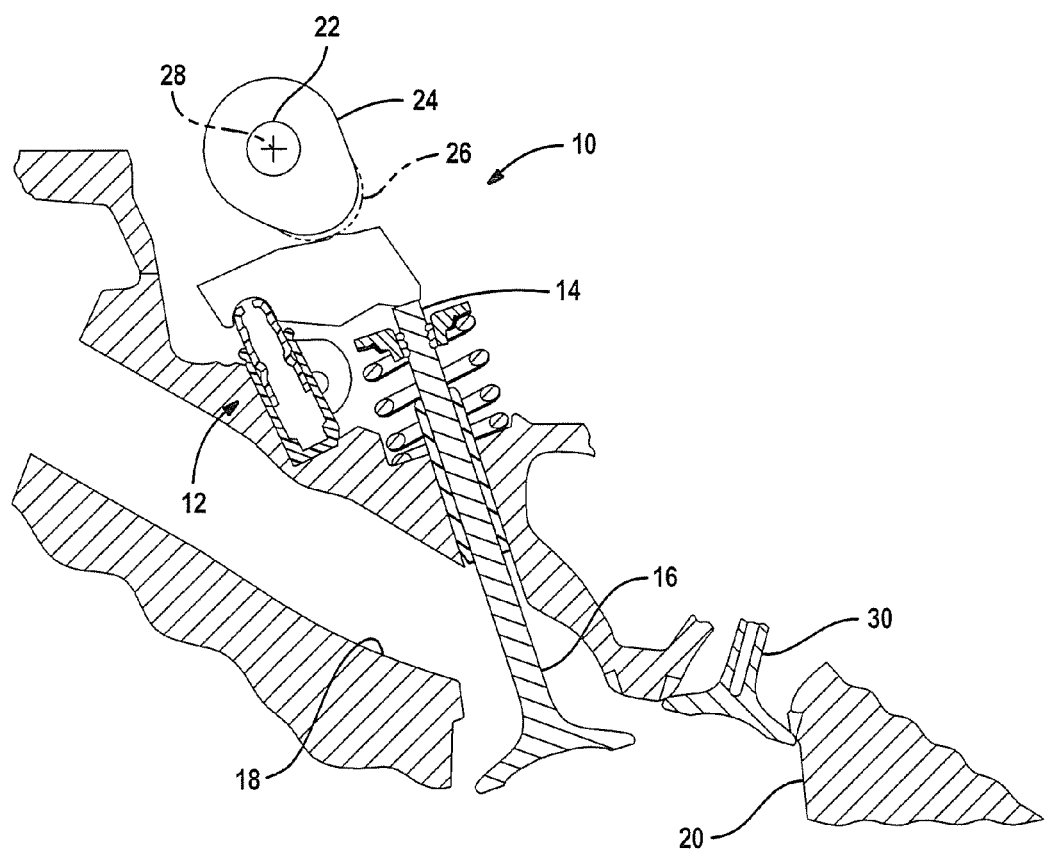
FIG. 1 is a cross-sectional view of an exemplary hydraulic lift mechanism according to the prior art.

Additionally, low-lift cam lobes (not shown) and high-lift cam lobes (not shown) are mounted to each of the intake and exhaust camshafts 54, 60. The low-lift cam lobes and high-lift cam lobes rotate with the intake and exhaust camshafts 54 and 60 and are in operative contact with a hydraulic lift mechanism, such as an SRFF mechanism as depicted in FIG. 1. Typically, distinct SRFF mechanisms operate on each of the intake and exhaust valves 52 and 58 of each cylinder 48. In the present implementation, each cylinder 48 includes two SRFF mechanisms.

Each SRFF mechanism provides two levels of valve lift for one of the intake and exhaust valves 52 and 58. The two levels of valve lift include a low-lift and high-lift and are based on the low-lift cam lobes and high-lift cam lobes, respectively. During "normal" operation (i.e., low-lift operation or a low-lift state), a low-lift cam lobe causes the SRFF mechanism to pivot to a second position in accordance with the prescribed geometry of the low-lift cam lobe, and thereby open one of the intake and exhaust valves 52 and 58 a first predetermined amount. During high-lift operation (i.e., a high-lift state), a high-lift cam lobe causes the SRFF mechanism to pivot to a third position in accordance with the prescribed geometry of the high-lift cam lobe, and thereby opening one of the intake and exhaust valves 52 and 58 to open a second predetermined amount greater than the first predetermined amount.

A position sensor 68 senses a position of the cam phaser 62 and generates a cam phaser position signal indicative of the position of the cam phaser 62. A pressure sensor 70 generates a pressure signal indicating a pressure of the fluid supply supplied to the phaser actuator 65 of the cam phaser 62. It is anticipated that one or more pressure sensors 70 can be implemented. An engine speed and position sensor 72 is responsive to a rotational speed of the engine 42 and generates an engine speed signal in revolutions per minute (RPM). The position of the crankshaft may also be determined by sensor 72.

A control module 74 includes a processor and memory, such as random access memory (RAM), read-only memory (ROM), and/or other suitable electronic storage. The control module 74 communicates with the position sensor 68, the pressure sensor 70, and the engine speed sensor 72. The control module 74 may receive input from other sensors 76 of the exemplary vehicle including, but not limited to, oxygen sensors and/or engine coolant temperature sensors.

The control module 74 executes a diagnostic system of the present disclosure. The diagnostic system detects a failure state of one of the SRFF mechanisms of the engine 42 or the OCV 66 associated therewith based at least on the engine speed and signals transmitted from the speed and position sensor 72. More specifically, the diagnostic system identifies one of the cylinders 48 associated with the failed SRFF mechanism or OCV, thereby enabling the control module 74 to command remedial actions (e.g., limiting engine speed) in order to prevent damage to the engine 42.

The OCV 66 may be powered by a regulated voltage control module 84 that has an actual voltage output. The typical or rated voltage from the regulated voltage control module 84 may be referred to as nominal voltage, whereas the actual output voltage of the regulated voltage control module may vary over time. The regulated voltage control module 84 may have a range, for example, between 11.5 and 14.5 volts. The change in the output voltage of the regulated voltage control module may result in a different force being applied to the solenoid operating the OCV 66.

A MAP sensor 80 may be used to generate a MAP signal, which is communicated to the control module 74. By determining the MAP that corresponds to each cylinder, a failure of the SRFF may be determined. The MAP signal may be used to obtain an average signal for all of the cylinders as well as an average cylinder signal for one of the cylinders. As will be described below, a comparison between the difference of the MAP values for one cylinder and the average of all the cylinders to a MAP threshold is used to determine an SRFF failure.

An exhaust gas oxygen sensor 82 generates an exhaust gas signal corresponding to the amount of oxygen within the exhaust gases. The exhaust gas oxygen signal may provide an indication as to the A/F ratio from the cylinder from which the exhaust gases are emitted.

Figure 3:
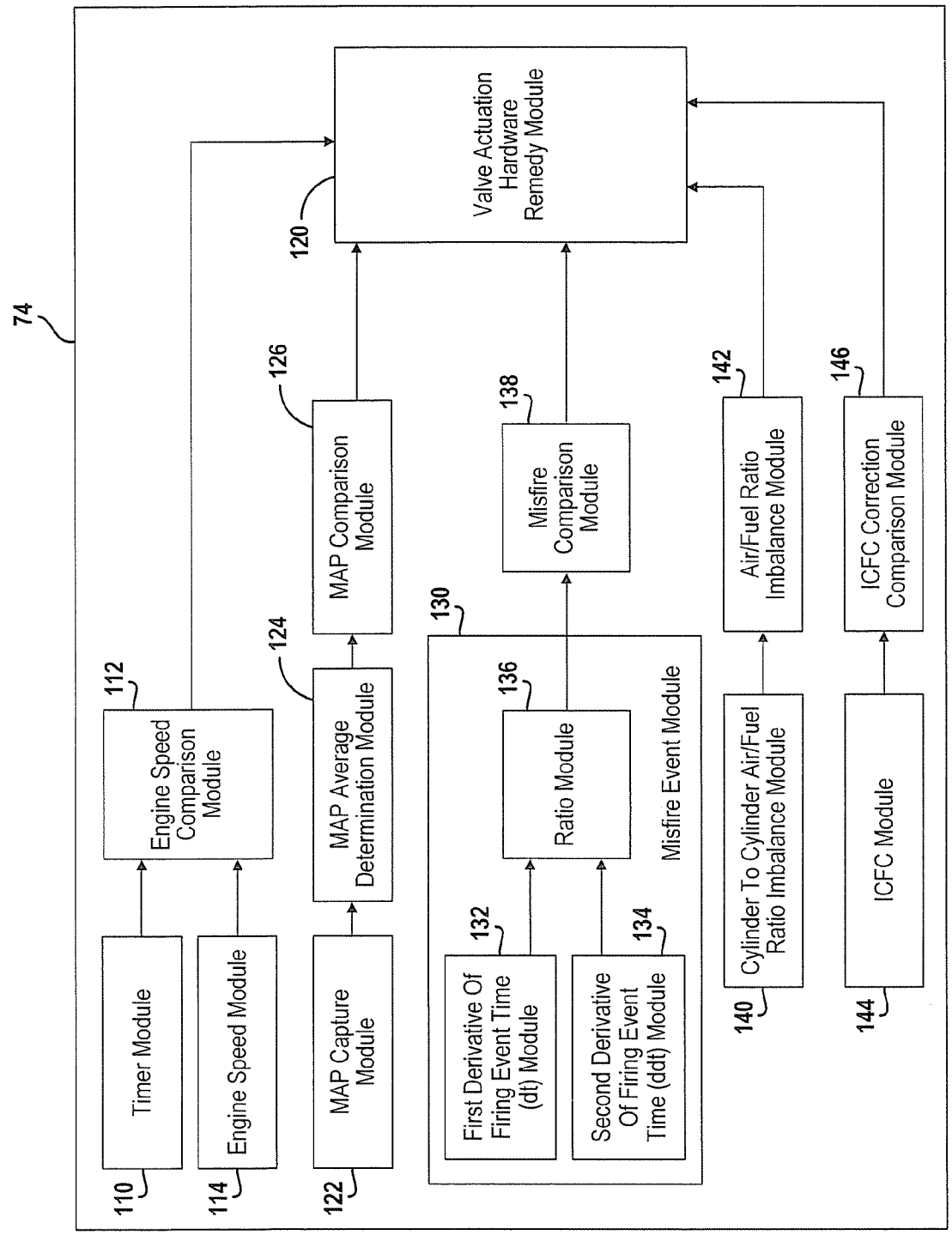
FIG. 3 is a detailed block diagrammatic representation of the control module 74.

Referring now to FIG. 3, the control module 74 is illustrated in further detail. The control module 74 may include a timer module 110 that is used for timing various events. The output of the timer module 110 may be communicated to the engine speed comparison module 112. The engine speed comparison module 112 receives an engine speed signal from the engine speed module 114. The engine speed module 114 may generate an engine speed corresponding to the amount of rotational speed of the engine. For example, the amount of rotations per minute of the engine crankshaft may be generated. The engine speed module 114 may receive the engine speed signal from the engine speed sensor 72 illustrated in FIG. 2. The engine speed comparison module 112 may compare the engine speed to a calibration speed. If the speed is not above a calibrated engine speed, the remaining portion of the hardware protection system may not be performed. It should be noted that the engine speed comparison module 112 may also determine whether the engine speed has been above a calibration speed or speed threshold for a predetermined amount of time. As an example, a speed threshold of above 5000 RPMs may be used.

The output of the engine speed comparison module 112 may be communicated to a valve actuation hardware remedy module 120. The valve actuation hardware remedy module 120 may reduce the engine speed to prevent damage to the valve actuation hardware.

An MAP capture module 122 generates an MAP signal. The MAP signal may be communicated to the MAP average determination module 124. The MAP average determination module may generate an average MAP for all of the cylinders within the engine. The MAP capture module 122 may be synched for each cylinder so that the MAP average determination module 124 may determine an MAP for all of the cylinders and an average pressure for one of the cylinders.

The MAP comparison module 126 may determine a MAP parameter based on a function of the MAP for a number of events to the MAP for all of the cylinders. The function may be subtraction. That is, the MAP parameter may be the average MAP for all of the cylinders minus the average MAP for a single cylinder. When the MAP parameter is greater than a MAP threshold, an indication of valve actuation hardware damage may be provided.

A misfire event module 130 may generate a misfire signal. The misfire signal may correspond to a difference of one firing event to another firing event (DT) and a (DDT) ratio. The DT may be generated in a DT module 132. The DDT signal may be generated in a DDT module 134. DT is using timing as an indication of cylinders slowing down due to misfire. DDT is used as a measure of a change in reference time difference and is used to detect cylinders which are firing after a misfire event since the crank may still slow compared to others due to the original misfire. Both modules 132 and 134 may derive outputs from the crankshaft position sensor. A ratio module 136 may generate a ratio of the DT and DDT signals to provide a ratio signal to a misfire comparison module 138. The misfire comparison module 138 compares the misfire parameter to a misfire threshold. The misfire threshold may be calibrated. The output of the misfire comparison module 138 may be provided to the valve actuation hardware remedy module 120.

The engine cylinder to cylinder air/fuel ratio imbalance module 140 may generate an air/fuel ratio variance signal for the cylinders monitored by an O2 sensor or a wide range air fuel ratio sensor. The variance signal may be provided to a variance comparison module 142. The air fuel ratio variance comparison module 142 may compare the variance signal to an air fuel ratio variance level threshold. The threshold may be calibrated. The output of the air fuel ratio imbalance module 142 may also be provided to the valve actuation hardware remedy module 120.

An individual cylinder fuel control (ICFC) module 144 may generate an individual cylinder fuel control signal. The individual fuel control signal may provide signals corresponding to an A/F ratio versus speed. The individual cylinder fuel control signals may be provided to an individual cylinder fuel control correction comparison module 146. The individual cylinder fuel control correction comparison module may compare the individual correction fuel control signal to an ICFC threshold. The ICFC threshold may be calibrated. The comparison results are provided to the valve actuation hardware remedy module 120.

Figure 4:
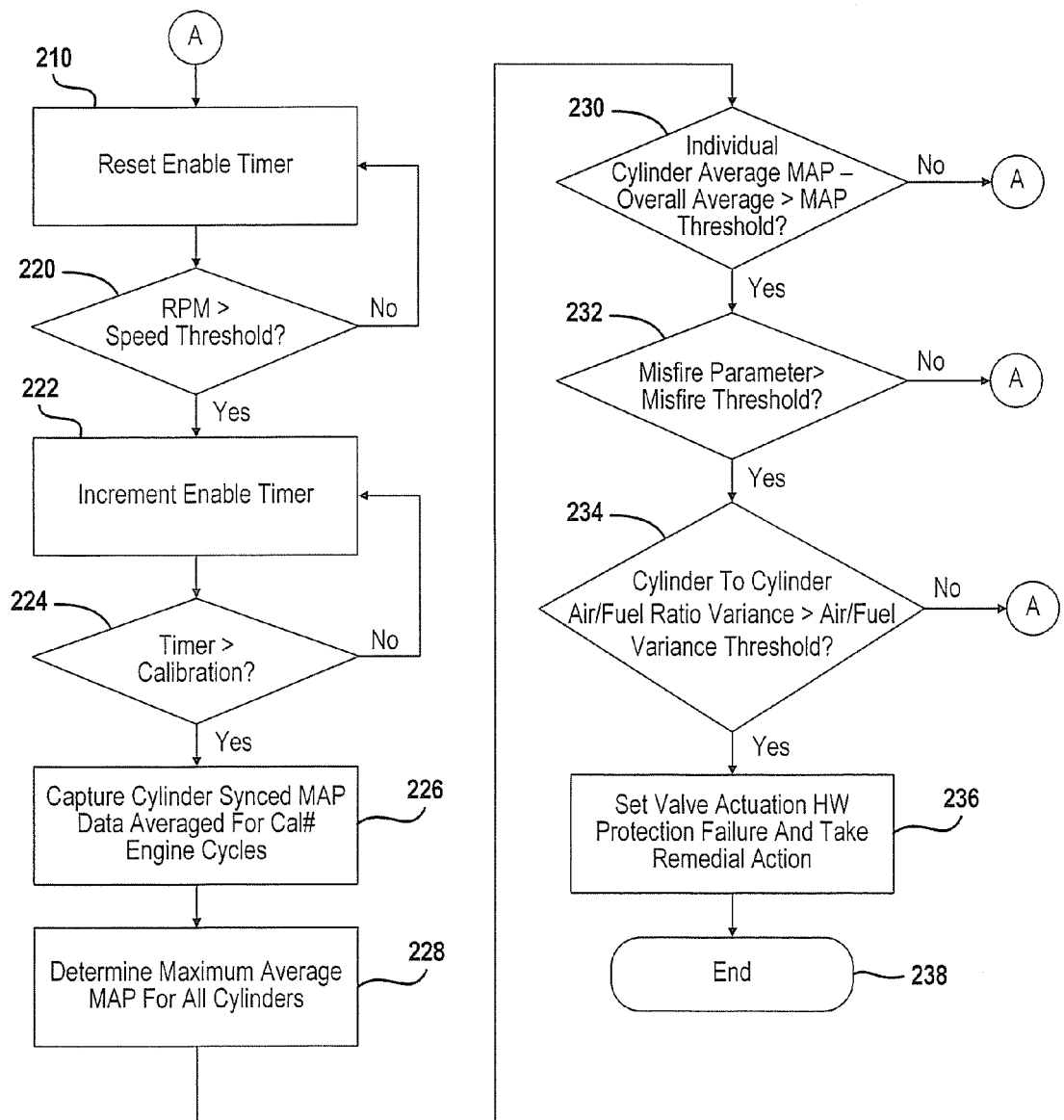
FIG. 4 is a flowchart of a non-intrusive method for protecting the hardware according to the present disclosure.

Referring now to FIG. 4, a non-intrusive method for hardware protection is set forth. In step 210, an enable timer is reset. In step 220, the engine speed is compared to a calibrated engine speed threshold. If the engine speed is not above an engine speed threshold, the enable timer is reset in step 210. In step 220, if the engine speed is greater than the engine speed threshold, step 222 enables an increment timer. In step 224, the timer is compared to a calibration time. When the calibration time is not greater than the calibration time, step 222 is again performed. In step 224, if the time is above a calibration time, indicating that the engine speed is above the calibration speed for a particular time, step 226 is performed.

In step 226, the MAP for each cylinder is determined. Each cylinder may have a number of MAP signals averaged for a predetermined number of calibrated cycles. In step 228, the individual average MAP for all of the cylinders is determined. In step 230, the overall average is subtracted from the individual averages to form an MAP parameter, which is compared to an MAP threshold. When the difference of the individual average MAP and the overall average (the MAP parameter) are compared to an MAP threshold, and the difference is not greater than the MAP threshold, step 210 is again performed.

When the difference is above the MAP threshold, step 232 determines a misfire parameter. The misfire parameter may be the DT ratio, the DDT time or the ratio of the two. When the misfire parameter is not above a misfire threshold, step 210 is performed. After steps 230 and 232, when step 210 is performed, the SRFF may be operating properly.

Referring now to step 234, a cylinder to cylinder air fuel ratio variance metric is compared to an air fuel ratio variance threshold. When the variance metric is not greater than the variance level threshold, step 210 is again performed. When step 210 is performed, the SRFF are operating properly.

In step 234, if the cylinder to cylinder air fuel ratio variance metric is above the oxygen level threshold, step 236 is performed. In step 236, a valve actuation hardware protection failure remedial action may be performed. One remedial action is to reduce the engine speed until a failure is no longer detected. In step 238, the method ends.

Figure 5:
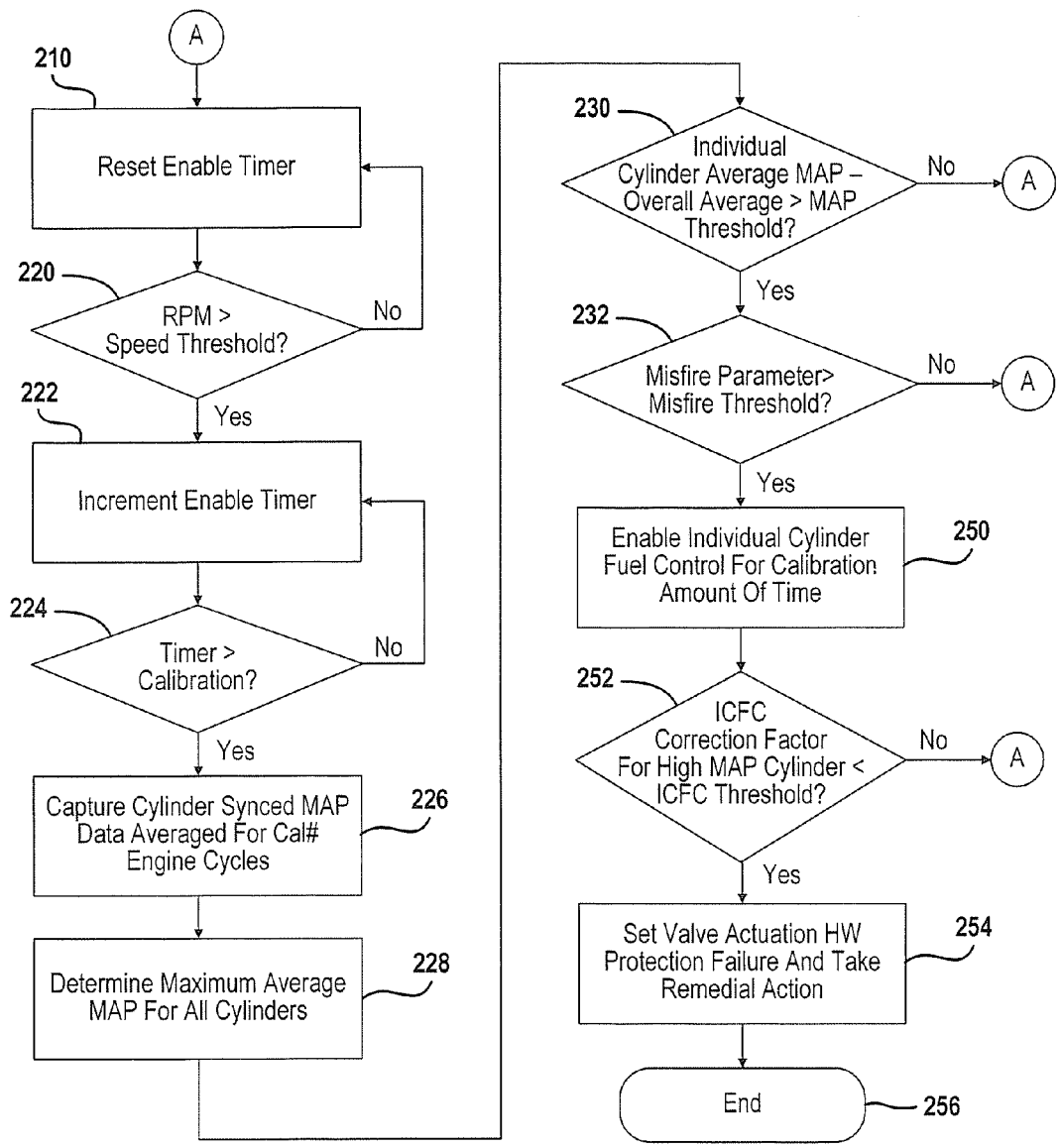
FIG. 5 is an intrusive individual fuel control method for protecting the hardware of the engine according to the present disclosure.

Referring now to FIG. 5, the same steps described above between steps 200 and 232 are identical and therefore not described further. In this embodiment, another means for determining an SRFF error is provided. Step 250 is performed after step 232 when the misfire parameter is greater than a misfire calibration threshold. In step 250, individual cylinder fuel control (ICFC) for a calibration amount of time may be performed. In this manner, a known amount of fuel may be provided to the cylinders. In step 252, an individual cylinder fuel control correction factor for a high MAP cylinder may be compared to an individual cylinder fuel control calibration threshold. When the individual cylinder fuel correction factor is not less than the threshold, step 210 may again be performed. When the individual cylinder fuel control correction factor is less than a calibration threshold, step 254 may be performed. In step 254, remedial action, such as reducing the engine speed may be performed as a remedial action.

In step 256, the engine method ends.

Referring now to FIG. 6A, an amount of air per cylinder versus engine speed is illustrated for various load conditions. A heavy load condition is illustrated by the dots in row 310. The dots in 312 illustrate a medium load and the dots in row 313 illustrate a light load. FIG. 6B illustrates base line data for an injector correction.

In FIG. 6C, the injector correction needed for a single failed SRFF in cylinder 4 is illustrated. As can be seen, the fuel correction factors are scattered lower as the engine speed increases. The lower fuel correction factor indicates that the cylinder is rich due to an air flow restriction that may be caused from an SRFF being stuck.

Referring now to FIGS. 7A and 7B, the effect of an SRFF failure on the manifold pressure drop is illustrated. Signal 380 in FIGS. 7A and 7B represent the cylinder identifier. The signals 382A and 382B represent the intake manifold pressure. In a cylinder with a failed SRFF, the air flow into the cylinder can be restricted resulting in a smaller manifold pressure drop during that cylinders intake event. In 382A, the manifold pressure drop shows very little deviation from one cylinder to the next indicating that each cylinder is consuming a consistent amount of air and thus no failed SRFF's. In 382B, the pressure drop associated with one of the intake events is lower than all others for each engine cycle indicating a floe restriction and thus a failed SRFF.

Referring now to FIGS. 8A and 8B, a relative average manifold pressure drop for each cylinder with no failures for multiple engine speeds and loads is illustrated.

In FIG. 8B, the relative average manifold pressure drop for each cylinder with a failed SRFF in Cyl#3 is illustrated. The large positive values above 0.1 indicate a smaller drop in pressure due to the intake event and therefore, a failed SRFF.

Referring now to FIGS. 9A and 9B, the effect of one non-fueled cylinder on the misfire parameters DT and DDT is illustrated. Misfire events illustrated at 410 and 412 in FIG. 9A results in both positive DT and DDT measured for the misfiring cylinder and negative DT and DDT for cylinder following the misfired cylinder. Reference numeral 413 illustrates a position wherein no or less severe misfire events occur.

Referring now to FIGS. 10A-10C, misfire events for light load in FIG. 10A, medium load in FIG. 10B and heavy load in FIG. 10O are illustrated. In this example, the data is concentrated in one area indicating that misfire may not have occurred.

Referring now to FIGS. 11a-11C, FIG. 11C illustrates a heavy load and high-speed engine operation condition. The scattered data, which looks similar to that in FIGS. 9A and 9B, illustrates misfire caused by one failed SRFF.

Referring now to FIG. 12, the normal variance versus failure variance is illustrated for various load ranges. In higher load conditions, it can be seen that the air/fuel imbalance monitor illustrates an air fuel ratio imbalance that correlates to higher speeds and loads, which is the expected resulted for an SRFF that is stuck in low lift.

As can be seen by combining the various comparisons together, an accurate determination of whether an SRFF has failed may be determined. By diagnosing the failure of the SRFF, hardware damage at elevated engine speeds may be avoided by reducing the engine speed or other remedial actions.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:
1. A method comprising:
determining a manifold absolute pressure;
determining a manifold absolute pressure parameter based on a function of the manifold absolute pressure and an average manifold absolute pressure for a plurality of cylinders;
comparing the manifold absolute pressure parameter to a manifold absolute pressure threshold;
determining a misfire parameter;
comparing the misfire parameter to a misfire threshold; and
performing a valve actuation hardware remedy in response to comparing the manifold absolute pressure parameter and comparing the misfire parameter.

2. A method as recited in claim 1 wherein determining the manifold absolute pressure comprises determining the average manifold absolute pressure for one of the plurality of cylinders over a predetermined number of engine cycles.

3. A method as recited in claim 1 wherein determining the manifold absolute pressure parameter comprises determining the manifold absolute pressure parameter based on a difference between the manifold absolute pressure and the average manifold absolute pressure.

4. A method as recited in claim 1 further comprising:
determining a cylinder to cylinder air fuel ratio variance metric;
comparing the variance metric to a variance level threshold;
wherein performing the valve actuation hardware remedy comprises performing the valve actuation hardware remedy in response to comparing the manifold absolute pressure, comparing the misfire parameter and comparing the variance metric.

5. A method as recited in claim 4 wherein determining the air fuel ratio variance metric comprises determining cylinder to cylinder air fuel ratio imbalance from an oxygen sensor or wide range air fuel ratio sensor measurement.

6. A method as recited in claim 1 wherein performing the valve actuation hardware remedy comprises performing the valve actuation hardware remedy when the misfire parameter is greater than the misfire threshold.

7. A method as recited in claim 1 wherein performing the valve actuation hardware remedy comprises performing the valve actuation hardware remedy when the misfire parameter is greater than the misfire threshold and a difference between the manifold absolute pressure and the average manifold absolute pressure is greater than the manifold absolute pressure threshold.

8. A method as recited in claim 1 further comprising:
determining an individual cylinder fuel control correction factor;
wherein performing the valve actuation hardware remedy comprises performing the valve actuation hardware remedy in response to comparing the manifold absolute pressure parameter, comparing the misfire parameter and comparing the individual fuel control correction factor.

9. A method as recited in claim 8 wherein determining the individual fuel control correction factor comprises determining the individual cylinder fuel control correction factor based on an oxygen sensor or wide range air fuel ratio sensor measurement.

10. A method as recited in claim 1 further comprising:
determining an engine speed; and
comparing the misfire parameter when the engine speed is above an engine speed threshold.

11. A method as recited in claim 1 wherein determining the misfire parameter comprises determining a rotation period variation ratio.

12. A method as recited in claim 1 wherein determining the misfire parameter comprises determining the misfire parameter based on a first derivative of a firing time and a second derivative of the firing time.

13. A method as recited in claim 1 wherein performing the valve actuation hardware remedy comprises determining a switchable roller finger follower error and performing the valve actuation hardware remedy in response to the switchable roller finger follower error.

14. A method as recited in claim 1 wherein performing the valve actuation hardware remedy comprises reducing an engine speed.

15. A control module comprising:
a first electronic circuit configured to determine a manifold absolute pressure parameter based on a function of a manifold absolute pressure and an average manifold absolute pressure for a plurality of cylinders and to compare the manifold absolute pressure parameter to a manifold absolute pressure threshold;
a second electronic circuit configured to determine a misfire parameter and to compare the misfire parameter to a misfire threshold; and
a third electronic circuit configured to perform a valve actuation hardware remedy in response to comparing the manifold absolute pressure and comparing the misfire parameter.

16. The control module of claim 15 further comprising a fourth electronic circuit configured to compare an air fuel ratio variance metric to a calibratable threshold and wherein the third electronic circuit is configured to perform the valve actuation hardware remedy in response to comparing the manifold absolute pressure parameter, comparing the misfire parameter and comparing the air fuel ratio variance metric.

17. The control module of claim 16 wherein the fourth electronic circuit is configured to determine the air fuel ratio variance metric based upon an oxygen sensor or wide range air fuel ratio sensor measurement.

18. The control module of claim 15 further comprising a fourth electronic circuit configured to determine an individual cylinder fuel control correction factor and wherein the third electronic circuit is configured to perform the valve actuation hardware remedy in response to comparing the manifold absolute pressure parameter, comparing the misfire parameter and comparing the individual cylinder fuel control correction factor.

19. The control module of claim 18 wherein the fourth electronic circuit is configured to determine the individual cylinder fuel control correction factor based on an O2 sensor or wide range air fuel ratio sensor measurement.

20. The control module of claim 15 wherein the second electronic circuit is configured to determine the misfire parameter based on a first derivative of a firing time and a second derivative of firing time.

21. The control module of claim 15 wherein the first, second, and third electronic circuits include at least one of an Application Specific Integrated Circuit (ASIC), a processor and memory including one or more programs, and a combinational logic circuit.

* * * * *